Nov. 28, 1950 V. E. DUNN Re. 23,296

WASHING MACHINE DRIVE MECHANISM

Original Filed March 15, 1935 2 Sheets-Sheet 1

INVENTOR
Vernon E. Dunn
BY
Zeffer & Zeffer
ATTORNEYS

Nov. 28, 1950 V. E. DUNN Re. 23,296

WASHING MACHINE DRIVE MECHANISM

Original Filed March 15, 1935 2 Sheets-Sheet 2

INVENTOR
Vernon E. Dunn
BY
Jeffers Jeffers
ATTORNEYS

Reissued Nov. 28, 1950 Re. 23,296

UNITED STATES PATENT OFFICE 23,296

WASHING MACHINE DRIVE MECHANISM

Vernon E. Dunn, Alliance, Ohio, assignor to The Dexter Company, Fairfield, Iowa, a corporation of Iowa Original No. 2,153,301, dated April 4, 1939, Serial No. 11,187, March 15, 1935. Application for reissue May 2, 1950, Serial No. 159,639

5 Claims. (Cl. 74—78)

Matter enclosed in heavy brackets [ ] appears in the original patent but forms no part of this reissue specification; matter printed in italics indicates the additions made by reissue

This invention is directed to drive mechanism for washing machine dollies and has for one of its objects the provision of a simple, efficient mechanism by means of which the power source of a washing machine mechanism is connected with the dolly thereof to operate the same in a satisfactory manner.

Another object is to provide a *washing machine drive mechanism comprising a* rotatable member having *an* eccentric connection with [an oscillatable member, said oscillatable member having geared connection with a washing machine dolly whereby oscillative movements of said member brings about alternately reverse rotation of the dolly.] *a reciprocatory rack member mounted on a round guide bar in an arrangement such that the member is held by the bar in sliding contact with the rotatable member and thus prevented from turning on the bar.*

Other objects will appear in the following description and accompanying drawings in which.

Figure 3:
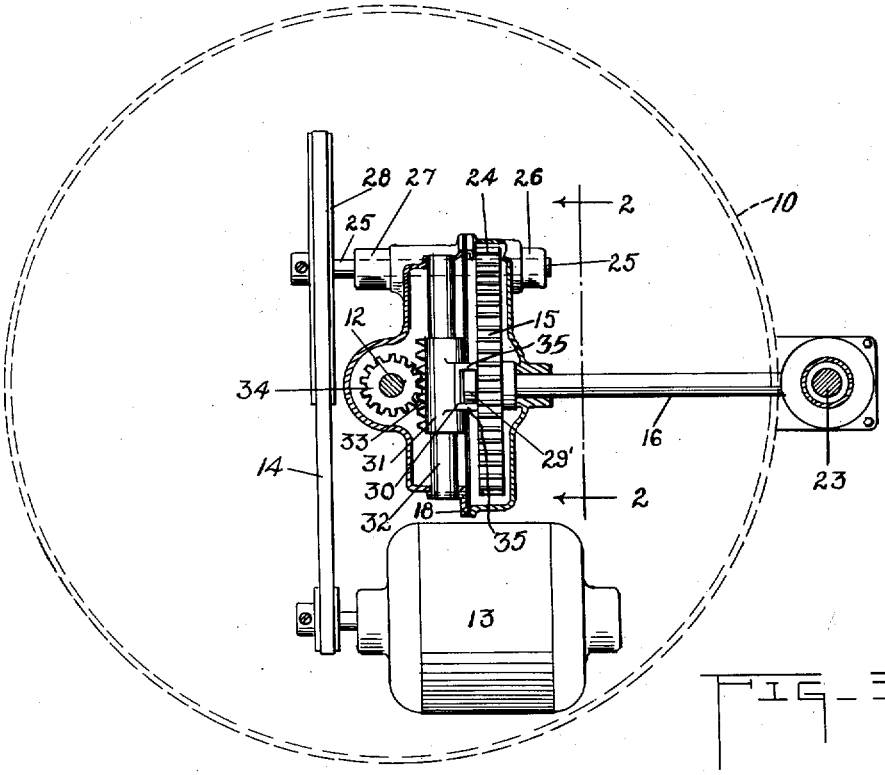
Fig. 3 is a plan view similar to Fig. 1 with certain parts shown as they actually appear.
Figure 4:
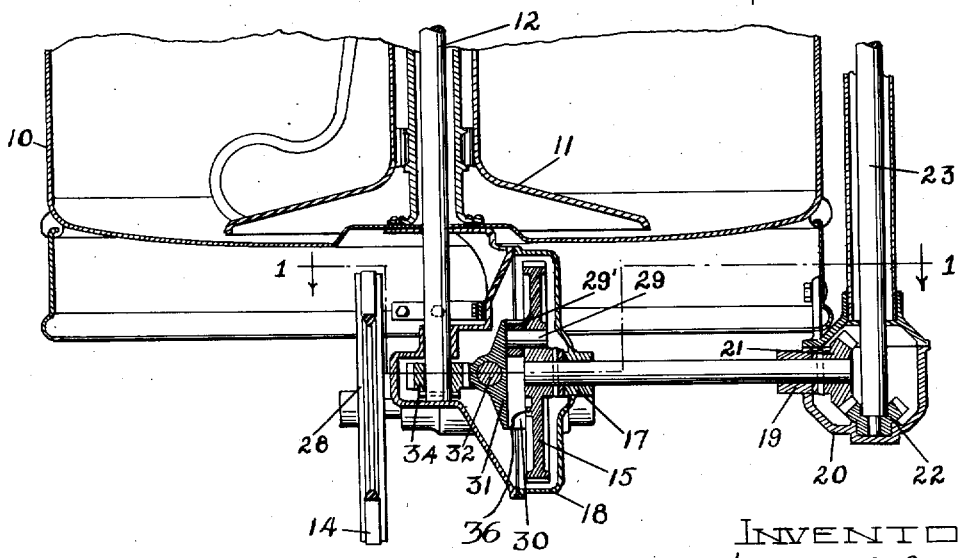
Fig. 4 is a sectional view in elevation showing details of elements to be described.

Figs. 3 and 4 disclose my invention as embodied in a washing machine mechanism which includes a conventional tub 10, a dolly 11 mounted to rotate therein, a vertical shaft 12 by means of which the dolly is operated, and an electric motor 13 having driving connection with the mechanism through a belt 14.

The apparatus would obviously include means for supporting the mechanism and tub, but such elements are thought sufficiently well known as to obviate detail showing and description herein.

In accordance with my invention a crank disc in the form of a gear 15 is affixed to one end of a horizontal shaft 16 which is journalled adjacent to the gear in a bearing 17 formed in a housing and support structure 18. At its opposite end the shaft 16 is journalled in a bearing 19 formed in an associated housing and support structure 20.

To the outer end of shaft 16 is secured a mitre gear 21 meshing with a mitre 22 which latter is affixed to a vertical shaft 23, the latter providing means for driving a wringer not shown but which is conventionally included in a washing machine apparatus.

Gear 15 is meshed with a pinion 24 affixed to a shaft 25 journalled in bearings 26 and 27 formed in structure 18. A pulley 28 is affixed to the outer end of shaft 25 and the belt 14 provides driving connection between the pulley and motor 13.

Gear 15, upon its face at the adjacent side of a member 31, carries a stud 29 offset from the axial center of the gear, which stud is provided with a roller 29' and is disposed and proportioned to be movably received in a guide groove 30, the sides of which are formed integrally with the body portion of member 31.

Member 31 is slidably supported upon a horizontally disposed round bar 32 which is stationarily supported at its ends in structure 18.

Integral with member 31 and disposed on one side opposite slot 30 is rack portion 33 which is meshed with a pinion 34 secured to dolly shaft 12. The bar 32 is round (circular in section) since this provides a relatively inexpensive and a very simple and effective construction. While it permits the member 31 to adjust itself to a certain extent with respect to the gear 15, the stud and roller 29, 29' and the pinion 34, in order to prevent the member 31 from varying from a proper position as respects the relationship between the rack 33 and pinion 34, those substantially parallel portions of member 31 which define the slot 30, project outwardly from the main body of member 31 as shown at 35 and are adapted to extend over and at all times to lie closely adjacent to a side portion 36 of the gear 15. Should the member 31 tend to pivot about the bar 32 to an undesirable extent, contact of portions 35 with portions 36 will limt the movement and will retain member 31 in its proper position regardless of its reciprocatory movements along bar 32.

Figure 1:
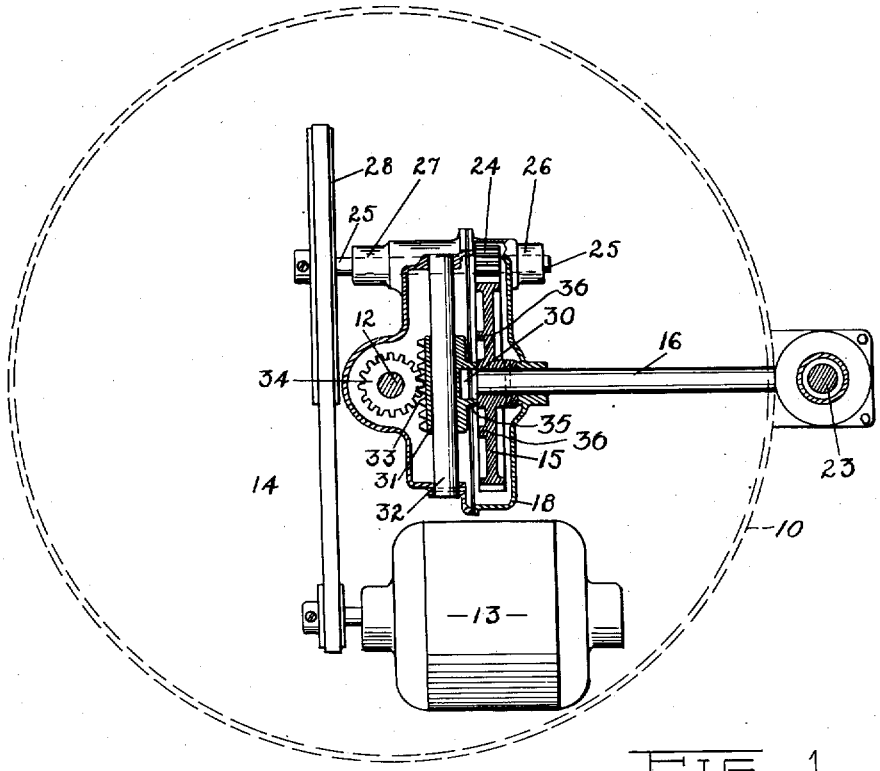
Fig. 1 is a sectional plan view showing portions of a washing machine drive mechanism embodying my invention, the view being taken approximately on line 1—1 in Fig. 4.
Figure 2:
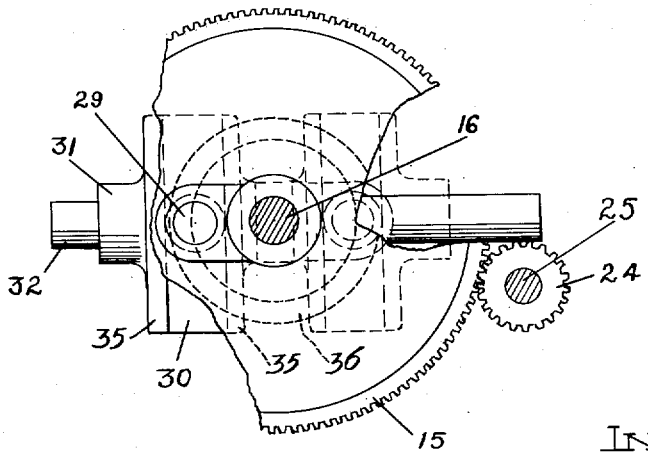
Fig. 2 is a fragmental view taken from line 2—2 in Fig. 3.

Operation of the device is as follows:

Gear 15 is rotated by motor 13, and stud 29, carried thereby, slides in groove 30 during the vertical component of its movement but carries member 31 with it during the horizontal component of its movement and by reason of this interengagement member 31 is caused to move to and fro upon bar 32. The movement is indicated in outline in Fig. 2.

The described movement of member 31, through the connection afforded by rack 33 with dolly pinion 34 obviously brings about oscillative rotative operation of the dolly 11 whereby to produce a well known washing action.

The foregoing has described an embodiment of my invention. Modifications of structure are obviously possible without alteration of the principle involved.

I do not wish to be limited in structure or function except within the scope of the appended claims.

What I claim is:

[1. Means for oscillating a washing machine dolly, said dolly having a vertical shaft and a drive pinion on said shaft, said means comprising a round bar mounted horizontally, a member slidable on said bar, rack teeth on said member engaging said pinion, a disc mounted for rotation and faced toward a side of said member, inter-engaging means between said disc and said member for effecting reciprocation of said member by rotation of said disc, said disc and member having mutually contactable portions preventing any substantial pivoting in either direction of said member on said bar.]

2. Means for oscillating a washing machine dolly, said dolly having a vertical shaft and a drive pinion on said shaft, said means comprising a round bar mounted horizontally, a member slidable on said bar, rack teeth on said member engaging said pinion, a crank disc mounted for rotation [and] *on a horizontal axis prependicular to said bar and intersecting the axis of the vertical shaft, said disc being* faced toward [a] *the* side of said member *opposite said rack teeth,* a crank pin projecting from the face of said crank disc, said member having a groove extending transversely of said rack and receiving said pin, said member having portions *extending above and below the axis of the disc and bearing* [adapted to bear] against the face of said disc to prevent any substantial pivoting in either direction of said member on said bar.

3. Means for oscillating a washing machine dolly, including a gear housing, a vertical dolly shaft extending from said housing, a drive pinion on said shaft, a horizontal round slide bar, a member slidable on said bar, rack teeth on said member engaging said pinion, a disc affixed to a horizontal shaft extending from said housing, interengaging means between said disc and member for effecting reciprocation of said member by rotation of said disc, said disc and member having mutually contactable portions preventing any substantial pivoting of said member on said bar.

4. Means for oscillating a washing machine dolly, including a gear housing, a vertical dolly shaft extending from said housing, a drive pinion on said shaft, a horizontal slide bar, a member slidable on said bar, rack teeth on said member engaging said pinion, a disc affixed to a horizontal shaft extending from said housing, interengaging means between said disc and member for effecting reciprocation of said member by rotation of said disc, said disc and member having mutually contactable portions preventing any substantial pivoting of said member on said bar.

5. Means for oscillating a washing machine dolly, including a gear housing, a vertical dolly shaft extending from said housing, a drive pinion on said shaft, a horizontal slide bar, a member slidable on said bar, rack teeth on said member engaging said pinion, a disc affixed to a horizontal shaft extending from said housing, interengaging means between said disc and member for effecting reciprocation of said member by rotation of said disc, said disc and member having mutually contactable portions preventing any substantial pivoting of said member on said bar, said disc extending downward to the lowermost part of the housing whereby lubrication is provided the other parts by rotation of the disc.

*6. In a washing machine having a gear housing and a vertical dolly shaft journalled in said housing and having a spur pinion non-rotatably secured thereto, a disc mounted for rotation on a horizontal axis perpendicular to the dolly shaft and having one side face spaced from the dolly shaft, a horizontal bar mounted in said housing in perpendicular relation to the axis of the disc and disposed between the disc and the dolly shaft, a rack member slidable on said bar and having rack teeth on one side thereof meshing with said pinion, said rack member having a vertically elongated portion extending above and below the bar and having a vertical groove therein on the side opposite said rack teeth, and a member mounted eccentrically of the disc and bearing in said groove, said vertically elongated portion of the rack member bearing on the face of the disc to hold the rack member against pivotal movement on the bar.*

VERNON E. DUNN.

REFERENCES CITED

The following references are of record in the patented file of this patent or the original patent:

UNITED STATES PATENTS

| Number | Name | Date |
|---|---|---|
| 720,140 | Hansfeld | Feb. 10, 1903 |
| 722,704 | Hansfeld | Mar. 17, 1903 |
| 1,611,859 | More | Dec. 21, 1926 |
| 1,742,616 | Schuyler | Jan. 7, 1930 |
| 1,754,548 | Dunn | Apr. 15, 1930 |

FOREIGN PATENTS

| Number | Country | Date |
|---|---|---|
| 426,712 | France | May 10, 1911 |